April 14, 1959 J. R. WHITE 2,882,336

COLOR SIGNAL-MATRIXING APPARATUS

Filed March 2, 1955 3 Sheets-Sheet 1

April 14, 1959 J. R. WHITE 2,882,336

COLOR SIGNAL-MATRIXING APPARATUS

Filed March 2, 1955 3 Sheets-Sheet 3

United States Patent Office 2,882,336
Patented Apr. 14, 1959

2,882,336

COLOR SIGNAL-MATRIXING APPARATUS

John R. White, Westbury, N.Y., assignor to Hazeltine Research, Inc., Chicago, Ill., a corporation of Illinois Application March 2, 1955, Serial No. 491,760

12 Claims. (Cl. 178—5.4)

*General*

The present invention is directed to matrixing apparatus for a color-television receiver and, more specifically, to such apparatus for combining or matrixing, without demodulation, modulation components of a subcarrier wave signal to develop other subcarrier wave signals having modulation components which are the algebraic sum of the combined modulation components.

The NTSC color-television signal now standard in the United States has a subcarrier wave signal of approximately 3.58 megacycles which includes chrominance information and, more specifically, is modulated in quadrature by a pair of color components conventionally designated as I and Q components. The Q component conveys information of the colors along an axis passing through green, white, and magenta in an ICI color diagram and, since the eye is least sensitive to changes in the colors falling along this axis, such information is transmitted with relatively low frequency, for example, with a maximum frequency of the order of 0.5 megacycle. The subcarrier wave signal is double side-band modulated over the range of approximately 3.1–4.1 megacycles by the Q component. The I component conveys information along an orange, white, cyan axis. Since the eye is more sensitive to color changes along the latter axis, the frequency range for the I component is required to be greater than that for the Q component being, for example, of the order of 0–1.5 megacycles. The 0–0.5 megacycle portion of the I component is transmitted as double side-band modulation of the subcarrier wave signal while that portion in the range of 0.5–1.5 megacycles is transmitted as single side-band modulation.

When the I and Q components are derived in a color-television receiver, since the Q component is a completely double side-band component of limited frequency range, any cross talk of the I component into the Q channel is beyond the frequency range of the detected Q component and, therefore, eliminated by proper filtering. Similarly, since the I component double side-band modulates the wave signal over the same range as the Q component, the effect of any cross talk of the Q component into the I channel is minimized. Therefore, to minimize cross talk between derived color-difference signals, it is desirable to derive I and Q color-difference signals rather than others, such as $R-Y$, $B-Y$, and $G-Y$. However, the color primaries employed for reproducing a televised color image are conventionally red, green, and blue and not the colors along the I and Q axes. Therefore, if the I and Q components are derived, they have to be combined in proper proportions, in other words, matrixed to develop $R-Y$, $G-Y$, and $B-Y$ color-difference signals for exciting, respectively, the red, green, and blue primaries.

An alternative to deriving the I and Q components and then combining proper proportions of these components to develop the $R-Y$, $G-Y$, and $B-Y$ color-difference signals is to derive the latter signals directly from the subcarrier wave signal by proper phasing of the demodulation apparatus. However, if such direct derivation of these color-difference signals is employed, the minimized cross-talk benefits obtained by deriving the I and Q components are lost since an excessive amount of cross talk tends to occur between the directly derived $R-Y$, $B-Y$, and $G-Y$ components. If the amount of cross talk is to be minimized, it is undesirable to derive the $R-Y$, $B-Y$, and $G-Y$ components directly from the subcarrier wave signal. On the other hand, the dual operation of demodulation of the I and Q components and the additional matrixing of the derived I and Q components to provide the desired $R-Y$, $B-Y$, and $G-Y$ components having a minimum of cross talk tends to increase the complexity of a receiver and requires the utilization of more vacuum tubes than is desirable.

In a copending application Serial No. 384,488, filed October 6, 1953, by W. C. Espenlaub and B. D. Loughlin, a matrixing apparatus is described in which the I and Q components of a subcarrier wave signal are combined in proper proportions and in such manner, while still modulation components of the subcarrier wave signal, as to develop $R-Y$, $B-Y$, and $G-Y$ modulation components. The latter $R-Y$, $B-Y$, and $G-Y$ modulation components can then be derived from the resultant subcarrier wave signal with decreased cross talk. However, though the matrixing apparatus described in such copending application, now conventionally known as a subcarrier matrix and so referred to hereinafter, provides to some degree the minimized cross-talk benefits obtained by first deriving I and Q components and then matrixing such components to provide the $R-Y$, $B-Y$, and $G-Y$ components, some undesired cross talk still tends to occur. Such cross talk arises from the fact that the ratio of the band widths of the I to the Q modulation components, combining to form the $R-Y$, $B-Y$, and $G-Y$ modulation components which are derived, is less than that obtainable when directly deriving the I and Q components. Additionally, the $B-Y$ modulation component developed by such matrix requires of the order of twice as much amplification as would be required if derived I and Q components had been matrixed to provide the $B-Y$ component. Also, in the subcarrier matrix described in the copending application, no provision is made for providing a boost in the level of the single side-band portion of the I component so that equal energy is available in the double side-band and single side-band portions of the I component. The signal-matrixing apparatus described herein is an improved subcarrier matrix not having these deficiencies.

It is, therefore, an object of the present invention to provide a new and improved signal-matrixing apparatus for a color-television receiver which does not have the disadvantages and limitations of prior such apparatus.

It is also an object of the invention to provide a new and improved signal-matrixing apparatus for a color-television receiver which is relatively simple and inexpensive.

It is a further object of the invention to provide a new and improved signal-matrixing apparatus for a color-television receiver which permits derivation of the $R-Y$, $B-Y$, and $G-Y$ components while retaining the wide band and narrow band benefits of the I and Q components.

It is a still further object of the invention to provide a new and improved signal-matrixing apparatus for a color-television receiver in which the I and Q modulation components are so matrixed to provide $R-Y$, $B-Y$, and $G-Y$ modulation components that the latter components may be derived with substantially equal demodulator gains.

In accordance with the present invention, there is provided signal-matrixing apparatus for a color-television receiver which comprises means for supplying a subcarrier wave signal double side-band modulated at one phase by a relatively narrow band component and at least partially single side-band modulated at another phase by a relatively wide band component, each of these components being representative of a different component color of a televised image. The apparatus also includes a transformer network responsive to the wave signal having a pass band substantially centered on the mean frequency of the wave signal with a width approximately equal to the band width of the double side-band modulation and with specific amplitude-translation and phase-translation characteristics for developing a first wave signal of specific amplitude modulated by the narrow band component at a specific phase with respect to an independent reference. Additionally, the signal-matrixing apparatus includes a delay-line network responsive to the wave signal having an amplitude-translation characteristic in the same ratio to the amplitude-translation characteristic of the transformer network as the relative magnitudes of the narrow band and wide band modulation components in a desired resultant modulation component representative of another component color and having a phase-translation characteristic equal to the sum of that of the transformer network and the difference in the modulation phases of the narrow band and wide band components on the supplied subcarrier wave signal for developing a second wave signal of specific amplitude modulated by the wide band component at the aforementioned specific phase with respect to the independent reference. Finally, the apparatus includes means for combining the first and second wave signals to develop a resultant wave signal having the desired resultant modulation component at the specific phase.

For a better understanding of the present invention, together with other and further objects thereof, reference is had to the following description taken in connection with the accompanying drawings, and its scope will be pointed out in the appended claims.

Referring to the drawings.

Figure 1:
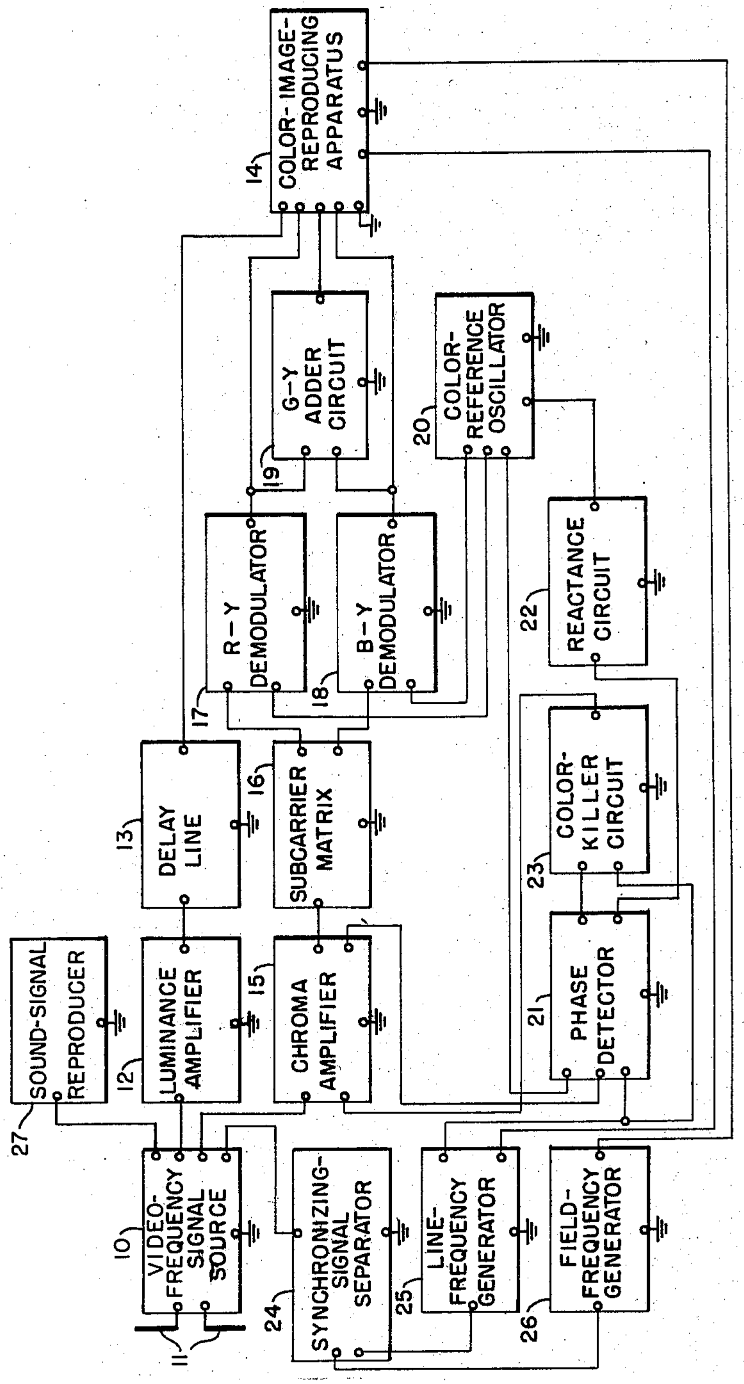
Fig. 1 is a circuit diagram of a color-television receiver having a signal-matrixing apparatus in accordance with the present invention.
Figure 2:
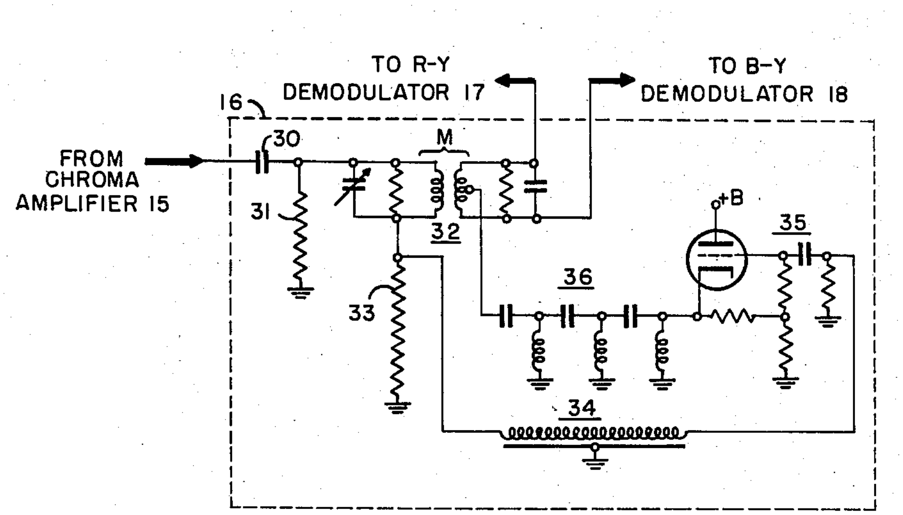
Fig. 2 is a detailed circuit diagram of an embodiment of the signal-matrixing apparatus of Fig. 1.
Figure 3A:
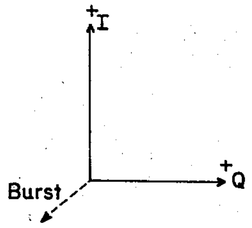
Figure 3B:
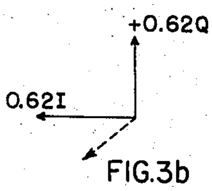
Figure 3C:
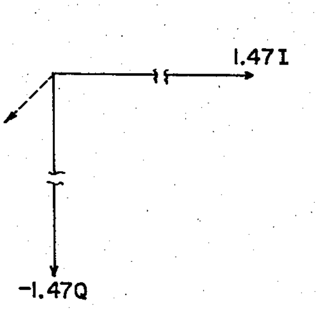
Figure 6:
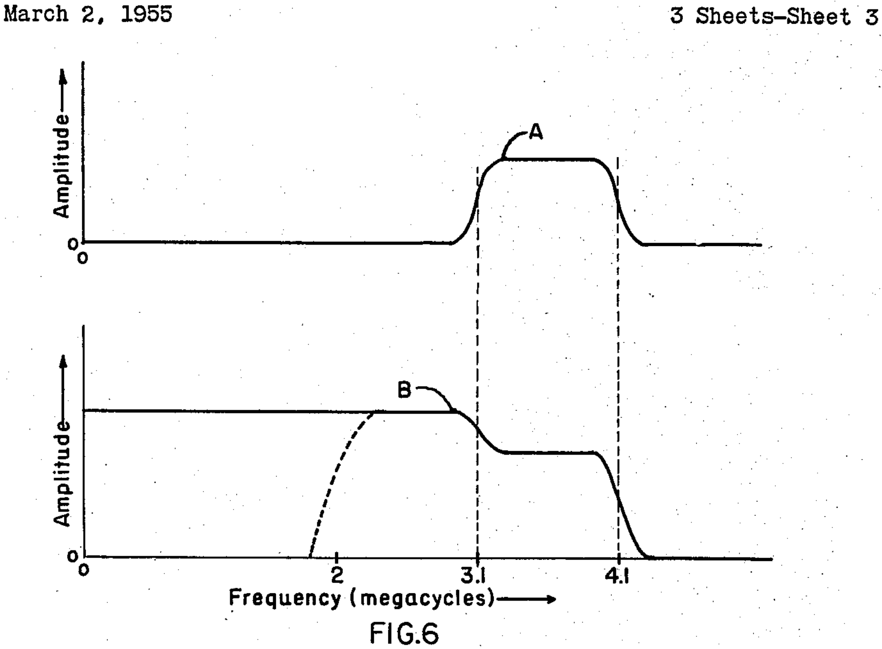
Figure 7:
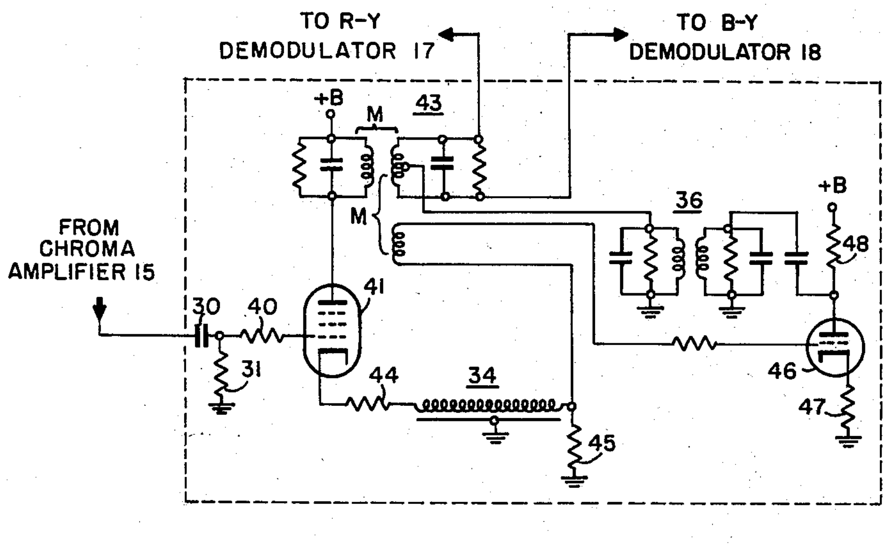

Figs. 3*a*–3*c*, inclusive, 4*a*–4*c*, inclusive, 5*b*, and 5*c* are vector diagrams utilized in explaining the operation of the matrixing apparatus of Fig. 2;

Fig. 6 is a set of curves utilized in explaining the operation of the matrixing apparatus of Fig. 2, and Fig. 7 is another detailed circuit diagram of another embodiment of the signal-matrixing apparatus of Fig. 1.

*General description of color-television receiver of Fig. 1*

Referring now to Fig. 1 of the drawings, there is represented a color-television receiver suitable for utilizing an NTSC type of color-television signal. The receiver includes a video-frequency signal source 10 which may be conventional equipment for supplying an NTSC type of composite video-frequency signal. For example, it may comprise a radio-frequency amplifier having an input circuit coupled to an antenna 11, an oscillator-modulator, an intermediate-frequency amplifier, and a detection system for deriving the video-frequency signal. An output circuit of the video-frequency signal source 10 is coupled through a luminance channel including, in cascade in the order named, a luminance amplifier 12 and a delay line 13 to an input circuit of a color-image-reproducing apparatus 14. The amplifier 12 may be a conventional wide band amplifier, for example, having a pass band of approximately 0–4.2 megacycles and the delay line 13 may be a conventional line proportioned to equalize the time of translation of the luminance signal through the amplifier 12 and the line 13 with that for translation of the chrominance signal through a chrominance channel to be discussed hereinafter. The color-image-reproducing apparatus 14 may be of conventional construction, for example, may comprise a three-gun multipurpose cathode-ray tube of the so-called shadow-mask type now employed in many color-television receivers.

An output circuit of the video-frequency signal source 10 is also coupled through a chrominance channel to input circuits of the color-image-reproducing apparatus 14. Such chrominance channel may include, in cascade in the order named, a chroma amplifier 15, a subcarrier matrix 16 in accordance with the present invention and to be described more fully hereinafter, and a parallel circuit of an $R-Y$ demodulator 17 and a $B-Y$ demodulator 18. The output circuits of the demodulators 17 and 18 are also coupled through a $G-Y$ adder circuit 19 to another input circuit of the image-reproducing apparatus 14. Input circuits of the demodulators 17 and 18 are individually coupled to a pair of output circuits of a 3.58 megacycle color-reference oscillator 20. The chroma amplifier 15 may be of conventional construction for translating a component of the video-frequency signal, for example, that portion of the video-frequency signal including the subcarrier wave signal, modulated at specific phases by narrow band Q and wide band I color-signal components, and its side bands. Such subcarrier wave signal has a mean frequency of approximately 3.58 megacycles and the side bands thereof usually extend from approximately 2.0 to 4.2 megacycles. Therefore, the amplifier 15 may have a pass band of the order of 2.0–4.2 megacycles. The demodulators 17 and 18 may also be of conventional construction, each including a synchronous detector for deriving a signal representative of a primary color. The $G-Y$ adder circuit 19 may be a conventional signal-combining circuit for developing the $G-Y$ color-difference signal from specific proportions of the $R-Y$ and $B-Y$ color-difference signals. The units 17, 18, and 19 are designed to develop colors representative of the red, blue, and green components of a televised image for application to the image-reproducing apparatus 14.

The output circuit of the chroma amplifier 15 is also coupled to a phase detector 21. Another input circuit of the detector 21 is coupled to an output circuit of the oscillator 20 and an output circuit of the unit 21 is coupled though a reactance circuit 22 to the oscillator 20. Another output circuit of the unit 21 is coupled through a color-killer circuit 23 to a gain-control circuit of the amplifier 15. The phase detector 21 and the color-killer circuit 23 may be of conventional construction, for example, such as described in an article entitled "The D.C. Quadricorrelator: A Two-Mode Synchronization System" in the January 1954 issue of the Proceedings of the I.R.E. at pages 288–299. The color-killer circuit develops a large negative bias potential when the oscillator 20 is not synchronized and substantially zero potential when it is synchronized to cause the amplifier 15 to be, respectively, nonconductive and conductive under those conditions.

Another output circuit of the video-frequency signal source 10 is coupled through a synchronizing-signal separator 24 to input circuit of a line-frequency generator 25 and a field-frequency generator 26, the output circuits of the latter units being coupled to horizontal and vertical deflection windings in the color-image-reproducing apparatus 14. Additionally, an output circuit of the generator 25, for example, a terminal on the horizontal deflection transformer therein is coupled to input circuits of the phase detector 21 and of the color-killer circuit 23.

A fourth output circuit of the video-frequency signal source 10 is coupled to a sound-signal reproducer 27 which may comprise a conventional intermediate-frequency amplifier, an audio-frequency amplifier, and a sound reproducer such as a loudspeaker.

Except for the subcarrier matrix 16, all of the circuit components described above and their combinations are conventional and well known. Therefore, no detailed description of such circuit components is provided herein.

*General operation of color-television receiver of Fig. 1*

Considering briefly now the operation of the receiver of Fig. 1 as a whole and assuming for the present that the matrix 16 is a simple wide band amplifier, a desired composite color-television signal of the NTSC type is intercepted by the antenna system 11, selected, amplified, converted to an intermediate-frequency signal, further amplified, and the composite video-frequency signal component thereof detected in the unit 10. Such composite video-frequency signal comprises conventional line- and field-synchronizing components, a color burst synchronizing component, and luminance and chrominance signals. The luminance signal, being substantially the same as a conventional monochrome signal, is amplified in the unit 12, delayed in time in the unit 13, and applied to the color-image-reproducing apparatus 14. The chrominance signal, specifically the modulated subcarrier wave signal and its side bands, is amplified in the unit 15, translated through the unit 16, and applied to the demodulators 17 and 18. In the demodulators 17 and 18, the $R-Y$ and $B-Y$ color-difference components of the subcarrier wave signal are derived by synchronous detection employing properly phased signals from the output circuits of the oscillator 20. The derived $R-Y$ and $B-Y$ components are then matrixed in the adder circuit 19 to provide a $G-Y$ color-difference signal. The signals $R-Y$, $B-Y$, and $G-Y$ are representative, respectively, of the red, blue, and green components of the televised color image. These color-difference signals are applied to the color-image-reproducing apparatus 14 to combine therein with the luminance signal to reproduce the televised image in color.

The signals developed in the oscillator 20 and applied to the demodulators 17 and 18 are maintained in proper phase relation with respect to the modulated subcarrier wave signal so that the proper color-difference signals will be derived. To effect this result, the phase detector 21 compares the phase of a signal developed in the oscillator 20 with that of a color burst synchronizing signal applied to the detector 21 from an output circuit of the amplifier 15. Any deviation of the phasing of the signals developed in the oscillator 20 from a specific phase relation results in the developing of a control signal in an output circuit of the detector 21. This control signal is employed by means of the reactance circuit 22 to eliminate such misphasing. A signal developed in the detector 21 is also employed in the color-killer circuit 23 to develop a bias potential which renders the chroma amplifier 15 nonconductive except when the color burst and locally generated signals are properly phased.

In the synchronizing-signal separator 24, the line- and field-synchronizing signals are separated from the composite video-frequency signal and from each other and are utilized, respectively, in the generators 25 and 26 to develop horizontal and field deflection signals. The latter signals are employed in the deflection windings of the apparatus 14 to cause the electron beam of such apparatus to scan a raster on the image screen thereof. A flyback pulse developed in, for example, the horizontal deflection transformer in the generator 25 is applied to input circuits of the phase detector 21 and color-killer circuit 23 to cause such units to be operative to develop their different control potentials substantially only during that period when the color burst signal is present. Such control potentials are averaged over the intervening periods.

In addition to the picture signal, a sound signal is also intercepted and an intermediate-frequency sound signal developed in the source 10. Such intermediate-frequency sound signal is then further amplified in the sound-signal reproducer 27 and the audio-frequency components thereof are detected and additionally amplified and utilized to reproduce sound in the unit 27.

*Description of signal-matrixing apparatus of Fig. 2*

Considering now in detail an embodiment of the matrix 16 of Fig. 1, specifically, the embodiment represented in Fig. 2, such matrixing apparatus comprises means for supplying a subcarrier wave signal double side-band modulated at one phase by a relatively narrow band component and at least partially single side-band modulated at another phase by a relatively wide band comnonent, each component being representative of a different component color of a televised image. More specifically, such supply means comprises the circuit coupling an output circuit of the chroma amplifier 15 to the subcarrier matrix 16 and includes a coupling condenser 30 and a shunt load resistor 31 connected to the series circuit of a tuned primary winding of a transformer 32 and an impedance-matching resistor 33. The subcarrier wave signal applied to the series circuit of the primary winding of the transformer 32 and the resistor 33 is modulated by the aforementioned I and Q modulation components individually representative of the different component colors previously discussed herein. The shunt resistor 31 is utilized to adjust the impedance of the output circuit of the chroma amplifier 15 to such value with relation to the impedance of the series circuit of the primary winding of the transformer 32 and the resistor 33 that there will effectively be a 3 decibel decrease in the signal developed across the resistor 33 at the resonant frequency of the primary winding of the transformer 32.

The signal-matrixing apparatus also includes a transformer network, specifically, the transformer 32 having tuned primary and secondary windings with the primary winding responsive to the supplied wave signal. The network has a pass band substantially centered on the mean frequency of the wave signal with a width approximately equal to the band width of the double side-band modulation. The resonant response of the primary and secondary windings is broad, extending substantially over the range of 3.1–4.1 megacycles, and these windings are so coupled as to cause a 90° phase shift in the signals translated therethrough. The transformer 32 has specific amplitude-translation and phase-translation characteristics for developing a first wave signal of specific amplitude modulated by the narrow band or Q component at a specific phase with respect to an independent reference, such as the phase of the color burst signal. In fact, in the embodiment of Fig. 2, not only is such a first wave signal developed but, additionally, a second wave signal having a different specific amplitude and modulated by the Q component at the aforesaid specific phase is also developed. To obtain such specific amplitudes, for reasons to be considered more fully hereinafter, the impedance between the upper terminal of the secondary winding of the transformer 32 and the tap point with respect to the impedance between the lower terminal of such secondary winding and the tap point is, substantially, in the ratio of 0.62:1.47. As will be described more fully hereinafter, the precise band width and phase-translation characteristic of the network including the transformer 32 may be determined from the delay characteristic of a delay line 34.

The signal-matrixing apparatus also includes a delay-line network responsive to the supplied wave signal. This delay line has an amplitude-translation characteristic in the same ratio to the amplitude-translation characteristic of the transformer network for the developed first wave signal as the relative magnitudes of the narrow band and wide band modulation components in a desired resultant modulation component representative of another component color. More specifically, such delay-line network includes the resistor 33, the delay line 34, a cathode-follower circuit 35, and a high-pass filter network 36. The resistor 33 is proportioned to provide the proper input impedance for the delay line 34 while the cathode-follower circuit 35 is similarly designed to provide the proper output impedance for the delay line 34 and also to isolate the delay line 34 from the filter network 36 to prevent interaction. The filter network 36 is a high-pass filter having a lower cutoff frequency of approximately 2.0 megacycles so that no low-frequency monochrome signals will be translated therethrough while all of the I modulation component is translated. This filter network is needed only if there is no prior filter with a similar lower cutoff frequency. The amplitude-translation characteristic of the delay-line network is designed to have a specific ratio to the impedances between the end terminals and the tap point of the secondary winding of the transformer 32 to develop a second wave signal of desired specific amplitude. More specifically, if the impedances in the secondary winding of the transformer 32 are in the ratio of 1.47 and 0.62 as before described, then the impedance of the delay-line network, in the same unit, has a magnitude of approximately 0.96 for reasons which will be explained more fully hereinafter.

The delay-line network also has a phase-translation characteristic, which relates both to envelope and phase delay, equal to the sum of that of the transformer network and the difference in the modulation phases of the narrow band and wide band components on the supplied subcarrier wave signal for developing the second wave signal of specific amplitude modulated by the wide band or I component at the aforementioned specific phase with respect to the independent reference phase. More specifically, such phase-translation characteristic of the delay-line network should be such that the over-all phase and envelope delay in the latter network is equal to the phase and envelope delay through the transformer network with an additional 90° phase shift for signals at subcarrier wave-signal frequency. The 90° phase shift is equal to the difference in the modulation phases of the I and Q components.

Each of the networks has phase, frequency, and amplitude characteristics and, for reasons which will become more understandable when explaining the operation of the matrix hereinafter, there should be no interaction of adjustments of the networks with regard to these characteristics. The previously described specific phase relationships are obtained by proportioning the band width of the transformer network with relation to the electrical length of the delay line 34 and other delays in the network including the delay line 34. For example, if it is decided that the delay line and the other circuit elements in the network including such line should have an over-all phase delay of approximately 900° for the subcarrier wave signal, using well-known equations and curves defining phase delays and band widths for coupled circuits, it is determined, for a coefficient of coupling of approximately unity in the transformer 32, that the band width of the transformer network at 6 decibel points should be approximately ±470 kilocycles centered on the subcarrier wave-signal frequency, if the desired equality of delay in the two networks, with an additional delay of 90° in the delay-line network, is to be obtained.

Finally, the signal-matrixing apparatus includes means for combining the first wave signal developed in the secondary winding of the transformer 32 and the second wave signal developed in the output circuit of the filter network 36 to develop a resultant wave signal having the desired resultant modulation component at the specific phase. More specifically, such combining means comprises the coupling of the output circuit of the filter network 36 to the tap terminal in the secondary winding of the transformer 32 for developing not only the resultant wave signal having a desired resultant modulation component such as $R-Y$ at the specific phase but additionally to develop another resultant wave signal having a $B-Y$ modulation component at the specific phase.

*Operation of signal-matrixing apparatus of Fig. 2*

Before discussing the details of operation of such matrixing apparatus, it will be helpful generally to consider the functioning of the different circuits in such apparatus. Referring to Fig. 2, a subcarrier wave signal modulated in quadrature by I and Q modulation components is applied through the condenser 30 to the primary winding of the transformer 32 and the input load resistor 33. The transformer 32 is proportioned to translate, with a specific phase and amplitude, the subcarrier wave signal and its side bands in the frequency range of 3.1–4.1 megacycles, more specifically, the modulation phase of the Q components is a predetermined specific phase in the secondary winding of the transformer 32. The network including the resistor 33, the delay line 34, the cathode-follower circuit 35, and the high-pass filter 36 is proportioned to translate all signal components having frequencies above approximately 2.0 megacycles with a specific amplitude with respect to the amplitudes of the signals developed between the tap terminal and the end terminals of the transformer 32. The signal translated through the network including the delay line 34 also is translated with such phase delay that when it is applied to the center tap of the secondary winding of the transformer 32, it has been rotated 90° with respect to the signal coupled from the primary to the secondary windings of the transformer. Consequently, in the secondary winding of the transformer 32 the two wave signals combine so that effectively the I modulation components on the wave signal translated through the network including the delay line 34 combine with the Q modulation components of the wave signal coupled from the primary to the secondary windings of the transformer 32. The relative magnitudes of the I and Q components combining in the secondary winding of the transformer 32 are such that wave signals modulated by $R-Y$ and $B-Y$ modulation components are developed at the end terminals of the secondary winding of the transformer 32.

Figure 4A:
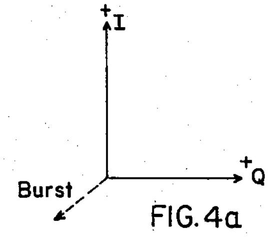

Considering the operation of the matrix apparatus now in more detail, it will be helpful to refer to the vector diagrams of Figs. 3*a*–3*c*, inclusive, 4*a*–4*c*, inclusive, 5*b*, and 5*c*. The vector diagrams of Figs. 3*a* and 4*a* are the same representing, respectively, the relative magnitudes and phase relationships of the I and Q modulation components of the wave signals applied to the input circuit of the transformer 32 and the input circuit of the delay line 34. The magnitudes of the signals developed across the primary winding of the transformer 32 and the resistor 33 need not be equal and, in fact, for some purposes to be considered more fully hereinafter are not equal but it simplifies the explanation of the principle of operation of the matrix if they are assumed to be equal. In these vector diagrams, as in all of the vector diagrams to be considered hereinafter, the constant reference phase to which all other phases are referred is indicated by the dashed line vector labeled "burst." This vector is shown in dashed line form to indicate that it is a reference vector and not part of the signal translated through the circuits considered.

The signal applied to the input circuit of the transformer 32 is limited in band width by the coupling and the tuning of the primary and secondary windings of such transformer and a wave signal having I and Q modulation components with the magnitudes and phase relationship represented by vector diagram 3*b* is developed between the upper terminal and the tap terminal in the secondary winding of the transformer 32. The relative magnitudes and phase relations of the I and Q modulation components in the wave signal developed between the tap terminal and the lower terminal of the secondary winding of the transformer 32 are represented by the vector diagram of Fig. 3*c*. The relative magnitudes and phase relations of the I and Q components of the wave signal in the output circuit of the filter network 36 and coupled to the tap terminal in the secondary winding of the transformer 32 are represented by both the vector diagram of Fig. 4*b* and the vector diagram of Fig. 4*c*.

The reason for the relative I and Q magnitudes and phase relations in the vector diagrams of Figs. 3*b*, 3*c*, 4*b*, and 4*c* becomes understandable when the color-difference signals $R-Y$ and $B-Y$ are defined in terms of the proportionate amounts of I and Q components therein. The $R-Y$ and $B-Y$ color-difference signals are definable as follows:

$$R-Y=0.62Q+0.96I \quad (1)$$

$$-0.87(B-Y)=-1.47Q+0.96I \quad (2)$$

Figure 4B:
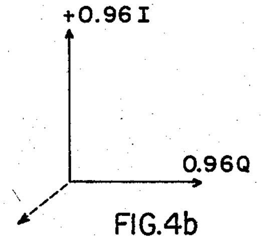
Figure 5B:
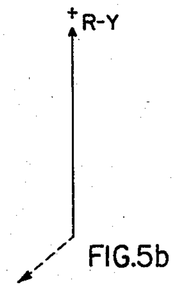
Figure 4C:
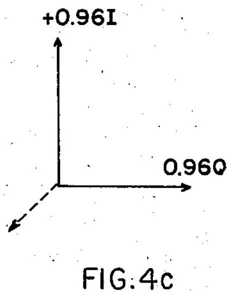
Figure 5C:
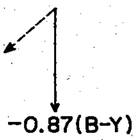

Referring to Equation 1 above and examining the vector diagrams of Figs. 3*b* and 4*b*, it is apparent that if the vertical vectors of +0.62Q and +0.96I are combined, a vector such as represented in Fig. 5*b* and representing the color-difference signal $+R-Y$ is developed. Consequently, the combining of the subcarrier wave signal applied to the tap terminal of the secondary winding of the transformer 32, and having a magnitude of +0.96, with that subcarrier wave signal developed between the upper terminal of the transformer 32 and the tap terminal, and having a magnitude of +0.62, results in the development of a subcarrier wave signal modulated by an $R-Y$ color-difference signal at the specific phase. Similarly, referring to Equation 2 above and considering the vector diagrams of Figs. 3*c* and 4*c*, it is apparent that, again, the addition of the vertical vectors, specifically, −1.47Q and +0.96I provides a vector $$-0.87(B-Y)$$

represented by Fig. 5*c*. Consequently, the signal developed at the lower terminal of the secondary winding of the transformer 32 is a subcarrier wave signal modulated by a $-0.87(B-Y)$ color-difference signal at the specific phase.

Figs. 5*b* and 5*c* show that the modulation component $R-Y$ is on one subcarrier wave signal at one phase with respect to the burst signal and the modulation component $B-Y$ is on another subcarrier wave signal and in antiphase to the $R-Y$ component. Therefore, referring to Fig. 1, the signal applied by the oscillator 20 to the $R-Y$ demodulator 17 can be employed with a simple 180° phase change to derive a positive $B-Y$ component in the demodulator 18. This simplifies the phasing of the signals in the oscillator 20. The difference in the magnitudes of the $R-Y$ and $B-Y$ modulation components as represented by the vertical vectors in Figs. 5*b* and 5*c* can be compensated for by either employing some attenuation in the $R-Y$ demodulator or some gain in the $B-Y$ demodulator.

In addition to the benefits just considered, the matrix 16 provides the additional feature of boosting the single side-band components of the I modulation signal. It is well known that the energy of a signal derived from a single side band is approximately half that from a double side band. Consequently, in order to make both the single side-band and double side-band energy equal for the derived I signal, the single side-band components are usually boosted by approximately 3–6 decibels with respect to the double side-band components. This can be done either before or after detection. The matrix apparatus 16 provides a simple, convenient means for effecting such boost prior to detection.

The chroma amplifier 15 is a multielectrode tube of the commonly designated constant-current type providing a stable source of current for the shunt loads of the resistor 31 and the series circuit of the primary of the transformer 32 and the resistor 33. Since the primary of the transformer 32 is a tuned circuit, its impedance varies with frequency being a maximum over the resonant range or, in other words, over the range of the Q component 3.1–4.1 megacycles and is a minimum outside of this range. The impedance of the resistor 33 remains relatively fixed over the 0–4.2 megacycle range. The resistor 31 acts as a stabilizer for the voltage across the primary winding of the transformer 32 and the resistor 33. Consequently, when the impedance of the resonant primary is a minimum, that is, for components outside the range of approximately 3.1–4.1 megacycles and including the single side-band range of approximately 2.0–3.1 megacycles of the I component, the signal developed across the resistor 33 is maximum. Over the resonant range of 3.1–4.1 megacycles, the magnitude of the signal developed across the primary winding of the transformer 32 is maximum and that across the resistor 33 is a minimum. The results are as represented by curves A and B of Fig. 6. Curve A represents the response of the transformer 32. Curve B represents the response of the delay-line network with the dashed line, at approximately 2 megacycles, indicating the lower cutoff frequency of the high-pass filter network 36. It is apparent from curves A and B of Fig. 6 that the I single side-band components in the region of 2.0–3.1 megacycles are boosted with respect to the double side-band components in the region of 3.1–4.1 megacycles, the change in the magnitude of the impedance of the tuned primary of the transformer 32 in the range of 3.1–4.1 megacycles causing a notch, in other words, a decrease in the magnitude of the components developed across the resistor 33 in this range.

Though the invention is in no means limited thereto, the following circuit values have been found to be suitable in the embodiment of Fig. 2:

| | |
|---|---|
| Condenser 30 | 1000 micromicrofarads. |
| Resistor 31 | 8200 ohms. |
| Resistor 33 | 4700 ohms. |
| Transformer 32 | |
| Primary | 85 turns of No. 36 SNE; .093 cambric insulation; Q of 21; 56.5 μH.; resonant at 3.6 mc. |
| Secondary | 50 turns of No. 36 SNE; .093 cambric insulation; Q of 32; 24.2 μH.; tap at 15th turn; resonant at 3.6 mc. |
| Mutual | 4.3 microhenries. |
| Primary resistor | 22,000 ohms. |
| Secondary resistor | 3300 ohms. |
| Primary condenser | 36 micromicrofarads. |
| Secondary condenser | 75 micromicrofarads. |
| Delay line 34 | Columbia Type HH-2500; 790° delay at approximately 3.6 mc. |

*Description and explanation of operation of signal-matrixing apparatus of Fig. 7*

Fig. 7 represents a signal-matrixing apparatus in which the input circuits of the transformer network and delay network are separated so that the parameters of the I and Q channels may be independently adjusted and other benefits, to be mentioned later, are obtained. Since many of the elements in the apparatus of Fig. 7 are identical with elements in the apparatus of Fig. 2, such elements are identified by the same reference numerals.

The output circuit of the chroma amplifier 15 is coupled to the control electrode of a multielectrode tube 41 through a resistor 40. The primary winding of the transformer 43, having secondary and tertiary windings, is coupled between the anode of the tube 41 and a source of positive potential. This primary winding is part of a resonant circuit tuned approximately to the frequency of the subcarrier wave signal and corresponds with the primary winding of the transformer 32 in Fig. 2. The secondary winding of the transformer 43 corresponds to the secondary winding of the transformer 32 in Fig. 2. The cathode circuit of the tube 41 is coupled through a resistor 44, the delay line 34, and a delay-line termination resistor 45 to a source of reference potential, such as chassis-ground. The junction of the delay line 34 and the resistor 45 is coupled through the tertiary winding of the transformer 43 to the control-electrode circuit of a tube 46. In order that the tertiary winding have the same delay characteristic and pass band as the secondary winding, it is tightly coupled to the secondary winding and is untuned. The signal from the tertiary winding develops the notch, in other words, the decrease in the magnitude in the signal translated through the delay line 34 over the double side-band range thereof. Therefore, the number of turns in the tertiary winding is selected to give the desired depth of the notch and the delay of the line 34 is adjusted to be 180° out-of-phase with the delay through the tertiary winding to provide the proper relative senses of the combining signals. The notch developed by the tertiary winding is phase compensated. In other words, except for the 180° difference, the delay at the tertiary winding is at least approximately that at the end of the delay line 34 so that all of the components applied to the triode 46, including both those within and outside of the notch range, are substantially linearly delayed in phase. As a result, the effective boost resulting from the notching of the signal translated through the delay line is a phase equalized boost.

The cathode of the tube 46 is coupled through a cathode load resistor 47 to ground while the anode thereof is coupled through an anode load resistor 48 to the source of positive potential and also coupled through the wide band filter network 36 to the tap terminal in the secondary winding of the transformer 43. The network 36 has a low end cutoff frequency of approximately 2 megacycles, an upper cutoff frequency of at least 4.1 megacycles, and a 90° phase-delay characteristic. Though shown as a pair of coupled tuned circuits, the network 36 may have any of a number of well-known forms. For example, it may be a delay line with proper pass-band characteristics. It is desired that whatever is used have minimum delay. The delay preferably should be no more than 90° or some small multiple thereof if any delay over 90° is compensated for in the delay network 34.

The matrix apparatus of Fig. 7 operates in a manner somewhat similar to that of the apparatus of Fig. 2. A pair of subcarrier wave signals with proper relative amplitudes and phases is developed in the secondary winding of the transformer 43 in response to a signal applied to the primary winding of such transformer by the tube 41. Another subcarrier wave signal of proper relative amplitude and phase is developed by means of the delay-line network and applied through the signal-isolating tube 46 and the filter network 36 to the tap terminal in the secondary winding of the transformer 43. As described with reference to the apparatus of Fig. 2, a pair of wave signals modulated by $R-Y$ and $B-Y$ components is developed at the end terminals of the secondary winding of the transformer 43.

To obtain single side-band boost for the I modulation component, a portion of the energy in the transformer 43, 180° out-of-phase with the signal at the end of the delay line 34 but otherwise with the same phase delay as the signal translated through the delay line, is coupled by means of the tertiary winding in such transformer into the delay-line network to notch or depress the level of the signal in such network over the range of approximately 3.1–4.1 megacycles. As previously explained, depression of the energy in this range results in a relative boost of the single sideband energy in the range of 2.0–3.1 megacycles. Because of the equalized phase delays through the delay line 34 and the tertiary winding, the boost is phase equalized. Due to the 180° phase relation of the signal at the end of the delay line 34 with respect to the signals in both the secondary and tertiary windings and the 180° phase reversal in the tube 46, the signal in the anode circuit of the tube 46 is substantially in phase with the signal in the secondary winding of the transformer 43. Therefore, the filter network 36 is designed to provide a 90° phase shift so that the I and Q modulation components add in the secondary winding.

The matrix apparatus of Fig. 7 provides independent input circuits for the wave signals thereby facilitating proportioning of the input circuit parameters. Such apparatus also includes a simple means for adjusting the depth of the notch in the I signal without disturbing the components in the Q channel. In addition, the notch has exactly the inverse shape of the signal in the secondary winding of the transformer thereby providing more accurate single side-band boost.

The signal-matrixing apparatus described herein is such as to retain the full benefiits of the narrow band Q and wide band I signals while permitting direct derivation of the desired $R-Y$, $B-Y$, and $G-Y$ components. The matrix is relatively stable in operation since essentially only passive circuit elements and networks are employed. In addition, the signal-matrixing apparatus is so designed that while effecting the desired matrixing at the same time it effects a desired boost for the single side-band components of the I signal. Additionally, the resultant subcarrier wave signals developed in the matrix and modulated by the $R-Y$ and $B-Y$ components have substantially equal levels thereby facilitating derivation of these components without need for additional relative amplification.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Signal-matrixing apparatus for a color-televison receiver comprising: means for supplying a subcarrier wave signal double side-band modulated at one phase by a relatively narrow band component and at least partially single side-band modulated at another phase by a relatively wide band component, each component being representative of a different component color of a televised image; a transformer network responsive to said wave signal having a pass band substantially centered on the subcarrier frequency thereof with a width approximately equal to the band width of said double side-band modulation and with specific amplitude-translation and phase-translation characteristics for developing a first wave signal of specific amplitude modulated by said narrow band component at a specific phase with respect to an independent reference; a delay-line network responsive to said wave signal having an amplitude-translation characteristic in the same ratio to said amplitude-translation characteristic of said transformer network as the relative magnitudes of said narrow band and wide band modulation components in a desired resultant modulation component representative of another component color and having a phase-translation characteristic equal to the sum of that of said transformer network and the difference in the modulation phases of said narrow band and wide band components on said supplied subcarrier wave signal for developing a second wave signal of specific amplitude modulated by said wide band component at said specific phase with respect to said independent reference; and means for combining said first and second wave signals to develop a resultant wave signal having said desired resultant modulation component at said specific phase.

2. Signal-matrixing apparatus for a color-television receiver comprising: means for supplying a subcarrier wave signal double side-band modulated at one phase by a relatively narrow band component and at least partially single side-band modulated at another phase by a relatively wide band component, each component being representative of a different component color of a televised image; a transformer network having a primary and a secondary winding, said primary winding being responsive to said wave signal and having a pass band substantially centered on the subcarrier frequency thereof with a width approximately equal to the band width of said double side-band modulation and with specific amplitude-translation and phase-translation characteristics for developing in said secondary winding a first wave signal of specific amplitude modulated by said narrow band component at a specific phase with respect to an independent reference; a delay-line network having an input circuit in series with said primary winding responsive to said wave signal, having an amplitude-translation characteristic in the same ratio to said amplitude-translation characteristic of said transformer network as the relative magnitudes of said narrow band and wide band modulation components in a desired resultant modulation component representative of another component color, and having a phase-translation characteristic equal to the sum of that of said transformer network and the difference in the modulation phases of said narrow band and wide band components on said supplied subcarrier wave signal for developing a second wave signal of specific amplitude modulated by said wide band component at said specific phase with respect to said independent reference; and means for combining said first and second wave signals to develop a resultant wave signal having said desired resultant modulation component at said specific phase.

3. Signal-matrixing apparatus for a color-television receiver comprising: means for supplying a subcarrier wave signal double side-band modulated at one phase by a relatively narrow band component and at least partially single side-band modulated at another phase by a relatively wide band component, each component being representative of a different component color of a televised image; a transformer network having a primary winding responsive to said wave signal, having a pass band substantially centered on the subcarrier frequency thereof with a width approximately equal to the band width of said double side-band modulation and with specific amplitude-translation and phase-translation characteristics, and having a tapped secondary winding for developing at least a first wave signal of specific amplitude modulated by said narrow band component at a specific phase with respect to an independent reference; a delay-line network having an input circuit responsive to said wave signal, having an amplitude-translation characteristic in the same ratio to said amplitude-translation characteristic of said transformer network as the relative magnitudes of said narrow band and wide band modulation components in a desired resultant modulation component representative of another component color, having a phase-translation characteristic equal to the sum of that of said transformer network and the difference in the modulation phases of said narrow band and wide band components on said supplied subcarrier wave signal, and having an output circuit for developing therein a second wave signal of specific amplitude modulated by said wide band component at said specific phase with respect to said independent reference; and means for coupling said output circuit to said tap on said secondary winding to combine said first and second wave signals to develop in said secondary winding a resultant wave signal having said desired resultant modulation component at said specific phase.

4. Signal-matrixing apparatus for a color-television receiver comprising: means for supplying a subcarrier wave signal double side-band modulated at one phase by a relatively narrow band component and at least partially single side-band modulated at another phase by a relatively wide band component, each component being representative of a different component color of a televised image; a transformer network having a primary winding responsive to said wave signal, having a pass band substantially centered on the subcarrier frequency thereof with a width approximately equal to the band width of said double side-band modulation and with specific amplitude-translation and phase-translation characteristics, and having a secondary winding for developing a pair of wave signals each of specific amplitude and each modulated by said narrow band component at a specific phase with respect to an independent reference; a delay-line network responsive to said wave signal having an amplitude-translation characteristic in the same ratio to said amplitude-translation characteristic of said transformer network for one of said pair of wave signals as the relative magnitudes of said narrow band and wide band modulation components in a desired resultant modulation component representative of another component color and having a phase-translation characteristic equal to the sum of that of said transformer network and the difference in the modulation phases of said narrow band and wide band components on said supplied subcarrier wave signal for developing a third wave signal of specific amplitude modulated by said wide band component at said specific phase with respect to said independent reference; and means for combining said third wave signal with each of said pair of wave signals to develop a pair of resultant wave signals, one having said desired resultant modulation component at said specific phase and the other having another desired resultant modulation component at said specific phase.

5. Signal-matrixing apparatus for a color-television receiver comprising: means including a shunt load impedance for supplying a subcarrier wave signal double side-band modulated at one phase by a relatively narrow band component and at least partially single side-band modulated at another phase by a relatively wide band component, each component being representative of a different component color of a televised image; a transformer network having a primary and a secondary winding, said primary winding being responsive to said wave signal and having a pass band substantially centered on the subcarrier frequency thereof with a width approximately equal to the band width of said double side-band modulation and with specific amplitude-translation and phase-translation characteristics for developing in said secondary winding a first wave signal of specific amplitude modulated by said narrow band component at a specific phase with respect to an independent reference; a delay-line network having an input circuit, said primary winding and said input circuit being in series and in parallel with said shunt load impedance, said delay-line network being responsive to said wave signal, having an amplitude-translation characteristic in the same ratio to said amplitude-translation characteristic of said transformer network as the relative magnitudes of said narrow band and wide band modulation components in a desired resultant modulation component representative of another component color, and having a phase-translation characteristic equal to the sum of that of said transformer network and the difference in the modulation phases of said narrow band and wide band components on said supplied subcarrier wave signal for developing a second wave signal of specific amplitude modulated by said wide band component at said specific phase with respect to said independent reference; said primary winding and said input circuit having such impedances relative to that of said shunt load impedance that said second wave signal has maximum amplitude outside the frequency range of said pass band of said transformer network for boosting the single side-band components of said second wave signal; and means for combining said first and second wave signals to develop a resultant wave signal having said desired resultant modulation component at said specific phase.

6. Signal-matrixing apparatus for a color-television receiver comprising: means for supplying a subcarrier wave signal double side-band modulated at one phase by a relatively narrow band component and at least partially single side-band modulated at another phase by a relatively wide band component, each component being representative of a different component color of a televised image; a transformer network having a primary winding responsive to said wave signal, having a pass band substantially centered on the subcarrier frequency thereof with a width approximately equal to the band width of said double side-band modulation and with specific amplitude-translation and phase-translation characteristics, having a secondary winding for developing a first wave signal of specific amplitude modulated by said narrow band component at a specific phase with respect to an independent reference, and having a tertiary winding; a delay-line network having an input circuit coupled to said primary winding and responsive to said wave signal, having an amplitude-translation characteristic in the same ratio to said amplitude-translation characteristic of said transformer network as the relative magnitudes of said narrow band and wide band modulation components in a desired resultant modulation component representative of another component color, having a phase-translation characteristic equal to the sum of that of said transformer network and the difference in the modulation phases of said narrow band and wide band components on said supplied subcarrier wave signal, and having an output circuit coupled to said tertiary winding for developing in said output circuit a second wave signal of specific amplitude modulated by said wide band component at said specific phase with respect to said independent reference and with maximum amplitude outside the frequency range of said pass band of said transformer network for boosting the single side-band components of said second wave signal; and means for combining said first and second wave signals to develop a resultant wave signal having said desired resultant modulation component at said specific phase.

7. Signal-matrixing apparatus for an NTSC type of color-television receiver comprising: means for supplying an NTSC subcarrier wave signal double side-band modulated at one phase by a Q component and at least partially single side-band modulated in quadrature phase by an I component; a transformer network responsive to said wave signal having a pass band with a maximum width of substantially 3.1–4.1 megacycles and with specific amplitude-translation and phase-translation characteristics for developing a first wave signal of specific amplitude modulated by said Q component at a specfic phase with respect to an independent reference; a delay-line network responsive to said wave signal having an amplitude-translation characteristic approximately one and one-half times said amplitude-translation characteristic of said transformer network and having a phase-translation characteristic equal to the sum of that of said transformer network and 90° at the frequency of said supplied subcarrier wave signal for developing a second wave signal of specific amplitude modulated by said I component at said specific phase with respect to said independent reference; and means for combining said first and second wave signals to develop a resultant wave signal having an $R-Y$ modulation component at said specific phase.

8. Signal-matrixing apparatus for an NTSC type of color-television receiver comprising: means for supplying an NTSC subcarrier wave signal double side-band modulated at one phase by a Q component and at least partially single side-band modulated in quadrature phase by an I component; a transformer network having a primary winding responsive to said wave signal, having a pass band with a maximum width of substantially 3.1–4.1 megacycles and with specific amplitude-translation and phase-translation characteristics, and having a secondary winding for developing therein a first wave signal of specific amplitude modulated by said Q component at a specific phase with respect to an independent reference; a delay-line network having an input circuit in series with said primary winding responsive to said wave signal, having an amplitude-translation characteristic approximately one and one-half times said amplitude-translation characteristic of said transformer network, and having a phase-translation characteristic equal to the sum of that of said transformer network and 90° at the frequency of said supplied subcarrier wave signal for developing a second wave signal of specific amplitude modulated by said I component at said specific phase with respect to said independent reference; and means for applying said second wave signal to said secondary winding to combine said first and second wave signals to develop in said secondary winding a resultant wave signal having an $R-Y$ modulation component at said specific phase.

9. Signal-matrixing apparatus for an NTSC type of color-television receiver comprising: means including a shunt load impedance for supplying an NTSC subcarrier wave signal double side-band modulated at one phase by a Q component and at least partially single side-band modulated in quadrature phase by an I component; a transformer network having a primary winding responsive to said wave signal and having a pass band with a maximum width of substantially 3.1–4.1 megacycles and with specific amplitude-translation and phase-translation characteristics for developing a first wave signal of specific amplitude modulated by said Q component at a specific phase with respect to an independent reference; a delay-line network having an input circuit, said primary winding and said input circuit being in series and in parallel with said shunt load impedance, said delay-line network being responsive to said wave signal, having an amplitude-translation characteristic approximately one and one-half times said amplitude-translation characteristic of said transformer network, and having a phase-translation characteristic equal to the sum of that of said transformer network and 90° at the frequency of said supplied subcarrier wave signal for developing a second wave signal of specific amplitude modulated by said I component at said specific phase with respect to said independent reference; said primary winding and said input circuit having such impedances relative to that of said shunt load impedance that said second wave signal has maximum amplitude outside the frequency range of the side bands of said Q component for boosting the single side-band components of said second wave signal; and means for combining said first and second wave signals to develop a resultant wave signal having an $R-Y$ modulation component at said specific phase.

10. Signal-matrixing apparatus for an NTSC type of color-television receiver comprising: means for supplying an NTSC subcarrier wave signal double side-band modulated at one phase by a Q component and at least partially single side-band modulated in quadrature phase by an I component; a transformer network having a primary winding responsive to said wave signal, having a pass band with a maximum width of substantially 3.1–4.1 megacycles and with specific amplitude-translation and phase-translation characteristics, and having a secondary winding for developing a pair of wave signals each of specific amplitude and each modulated by said Q component at a specific phase with respect to an independent reference; a delay-line network having an input circuit coupled in series with said primary winding and responsive to said wave signal, having an amplitude-translation characteristic approximately one and one-half times said amplitude-translation characteristic of said transformer network for one of said pair of wave signals, and having a phase-translation characteristic equal to the sum of that of said transformer network and 90° at the frequency of said supplied subcarrier wave signal for developing a third wave signal of specific amplitude modulated by said I component at said specific phase with respect to said independent reference; and means for combining said third wave signal with each of said pair of wave signals to develop a pair of resultant wave signals, one having an $R-Y$ modulation component at said specific phase and the other having a $B-Y$ modulation component at said specific phase.

11. Signal-matrixing apparatus for an NTSC type of color-television receiver comprising: means for supplying an NTSC subcarrier wave signal double side-band modulated at one phase by a Q component and at least partially single side-band modulated in quadrature phase by an I component; a transformer network responsive to said wave signal having a pass band with a maximum width of substantially 3.1–4.1 megacycles, with a gain of approximately 0.62, and a specific phase-translation characteristic for developing a first wave signal with an amplitude of 0.62 with respect to a reference amplitude and modulated by said Q component at a specific phase with respect to an independent reference; a delay-line network responsive to said wave signal with a gain of approximately 0.96 and having a phase-translation characteristic equal to the sum of that of said transformer network and 90° at the frequency of said supplied subcarrier wave signal for developing a second wave signal with an amplitude of 0.96 with respect to said reference amplitude and modulated by said I component at said specific phase with respect to said independent reference; and means for combining said first and second wave signals to develop a resultant wave signal having an R-Y modulation component at said specific phase.

12. Signal-matrixing apparatus for an NTSC type of color-television receiver comprising: means for supplying an NTSC subcarrier wave signal double side-band modulated at one phase by a Q component and at least partially single side-band modulated in quadrature phase by an I component; a transformer network having a primary winding responsive to said wave signal, having a pass band with a maximum width of substantially 3.1–4.1 megacycles, and having a tapped secondary winding, said network having a gain of approximately 0.62 and 1.47 as measured between different ones of the end terminals of said secondary winding and said tap thereof and having a specific phase-translation characteristic for developing between said end terminals and said tap a pair of wave signals modulated by said Q component at a specific phase with respect to an independent reference and with relative amplitudes of 0.62 and 1.47 with respect to a reference amplitude; a delay-line network responsive to said wave signal with a gain of approximately 0.96 and having a phase-translation characteristic equal to the sum of that of said transformer network and 90° at the frequency of said supplied subcarrier wave signal for developing a third wave signal with a relative amplitude of 0.96 with respect to said reference amplitude modulated by said I component at said specific phase with respect to said independent reference; and means for combining said third wave signal with each of said pair of wave signals to develop a pair of resultant wave signals, one having an $R-Y$ modulation component at said specific phase and the other having a $B-Y$ modulation component at said specific phase.

No references cited.